United States Patent [19]
Kightlinger et al.

[11] 3,884,909

[45] *May 20, 1975

[54] GELATINIZABLE CROSSLINKED CATIONIC STARCH AND METHOD FOR ITS MANUFACTURE

[75] Inventors: Adrian P. Kightlinger, Clinton, Iowa; Edward K. Crosby, deceased, late of Clinton, Iowa, by Lovice Vivian Crosby, executrix; Edwin L. Speakman, Clinton, Iowa

[73] Assignee: Standard Brands Incorporated, New York, N.Y.

[ * ] Notice: The portion of the term of this patent subsequent to Dec. 11, 1990, has been disclaimed.

[22] Filed: Apr. 1, 1974

[21] Appl. No.: 456,493

Related U.S. Application Data

[63] Continuation-in-part of Ser. No. 400,300, Sept. 24, 1975, abandoned, which is a continuation-in-part of Ser. No. 298,067, Oct. 16, 1972, Pat. No. 3,778,431.

[52] U.S. Cl...... 260/233.3 R; 117/143 A; 260/17.3; 260/233.3 A; 260/233.5
[51] Int. Cl............................................. C08b 19/06
[58] Field of Search.... 260/233.3 R, 233.3 A, 233.5

[56] References Cited
UNITED STATES PATENTS
3,778,431   12/1973   Kightlinger et al. ......... 260/233.3 R

*Primary Examiner*—Melvyn I. Marquis

[57] ABSTRACT

A gelatinizable crosslinked cationic starch especially suitable for paper sizing is produced by (1) reacting starch with an alkali-catalyzable crosslinking agent and the reaction product of the crosslinking agent with ammonia or with an amine and (2) depolymerizing the resulting cationic crosslinked product.

13 Claims, No Drawings

GELATINIZABLE CROSSLINKED CATIONIC STARCH AND METHOD FOR ITS MANUFACTURE

THE INVENTION

This application is a continuation in part of Patent Application Ser. No. 400,300, filed Sept. 24, 1973 and now abandoned which is a continuation in part of Patent Application Ser. No. 298,067, filed Oct. 16, 1972 which issued as U.S. Pat. No. 3,778,431.

This invention relates to the preparation of cationically charged starch products. More particularly, the invention relates to gelatinizable crosslinked cationic starches, in which the starch is retained in its original granular form during the cationization and crosslinking of the starch, and to their preparation and application.

Cationic starches, or more correctly, cationic starch ethers, are old and well known in starch technology and have long been used principally in the manufacture of paper as wet end additives to increase wet web strength and pigment retention. Such cationic starches and their application in this manner are disclosed in U.S. Patents issued to Caldwell, U.S. Pat. Nos. 2,917,506 and 2,935,436, Meisel, U.S. Pat. No. 3,017,294, Kirby, U.S. Pat. No. 3,336,292, Shildneck et al., U.S. Pat. No. 3,346,563, Patel et al., U.S. Pat. No. 3,378,547, Hunt, U.S. Pat. No. 3,624,070 and Paschall, U.S. Pat. No. 2,876,217. Such materials can also be used as flocculating agents to separate solids from aqueous suspensions thereof, e.g. in the treatment of ores, sewage and industrial waste waters, as is shown in Caldwell, U.S. Pat. No. 2,975,124 and Paschall, U.S. Pat. No. 2,995,513.

In addition to the foregoing applications, cationic starches have in recent years become recognized as ecologically important replacements for conventional starch products in paper sizes. More particularly, it has been found that in the reprocessing of broke and/or the recycling of starch-sized paper little of the cationic starch is lost to the white water during repulping operations. Consequently, the white water has desirably lower (50–75%) B.O.D. and C.O.D. levels.

Applicants' invention is, therefore, directed to a novel starch composition in which the starch molecules have a strong cationic (positive) charge and have been coupled by means of a crosslinking agent. This combination of cationization and crosslinking followed by depolymerization yields a starch composition which possesses the following applicational advantages:

1. high attraction to paper fibers;
2. minimal starch removal during repulping;
3. excellent clarity of filtrates from repulped broke;
4. excellent viscosity stability; and
5. little or no non-starch residue.

Previously published studies have stated that when reacting starch with the reaction product of a crosslinking agent and a nitrogenous compound, the excess crosslinking agent must be stripped from the reaction product prior to carrying out the reaction with starch. It has now been found that the presence of the excess crosslinking agent during the reaction with starch imparts excellent viscosity stability to the final starch composition. Previously an excessive amount of cationization was required to give the desired viscosity stability. The method claimed by this invention therefore allows for a more economical use of the reagents and also decreases the cost of making the cationization reagent itself since stripping of the crosslinking agent is not required. Also the process permits reacting all of the components "in situ" if desired, thus increasing the flexibility of the production of such starch compositions.

In general, applicants' invention may be characterized as being a granular, gelatinizable, crosslinked, cationic starch product prepared by first cationizing and crosslinking the starch and then depolymerizing the starch. More particularly, the product of the invention is produced by the sequential steps of (a) reacting an aqueous suspension of granular starch under nongelatinizing conditions with (1) an alkali-catalyzable crosslinking agent, and (2) the reaction product of said crosslinking agent with a nitrogenous compound selected from the group consisting of ammonia and $C_{2-12}$ secondary and tertiary amines having the structure,

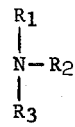

in which $R_1$ is a monovalent radical selected from the group consisting of hydrogen, alkyl, substituted alkyl, cycloalkyl, aryl, alkaryl, and aralkyl, $R_2$ and $R_3$ are monovalent radicals independently selected from the group consisting of alkyl, substituted alkyl, cycloalkyl, aryl, alkaryl, and aralkyl, and $R_2$ and $R_3$ when taken together form with the N atom saturated heterocyclic rings selected from the group consisting of substituted and unsubstituted piperidine, piperazine and morpholine, the length of any acyclic alkyl group being no greater than 4 carbon atoms, the reaction mixture having a slurry alkalinity of from about 20 to about 65, the amount of crosslinking agent being sufficient to react essentially with all of the amine as well as with some of the starch and the amount of amine being sufficient to impart to the starch a degree of substitution of from about 0.001 to about 0.10; and (b) depolymerizing the cationic crosslinked reaction product of step (a) to an alkaline paste fluidity of from about 201 to 299.

Various terms and expressions used herein are defined as follows:

Slurry alkalinity refers to the number of ml of 0.1 N HCL required to neutralize 30 ml of the reaction mixture using phenolphthalein indicator.

Degree of Substitution (D.S.) refers to the number of moles of nitrogen imparted to the starch per anhydroglucose unit (AGU), excluding any residual proteinaceous nitrogen contained in the starch. Thus, all nitrogen analyses herein have been adjusted to exclude native nitrogen in the starch. Nitrogen analyses were all performed by the standard Kjeldahl method.

Alkaline paste fluidity was determined by the basic procedure of Fetzer and Kirst as presented in *Cereal Chemistry*, Vol. 36, No. 2 (March, 1959), pages 108 to 127.

A wide variety of starches may be utilized in the process of the invention so long as they are granular in character. Thus, the term "starch" includes both root and cereal starches, e.g. corn, potato, tapioca, wheat, waxy sorghum, waxy maize, grain sorghum, rice, whether unmodified (raw) or modified as by oxidation, acid treatment and the like. However, it will normally be preferred to use unmodified granular starches since they are more economical.

As used herein, the term "crosslinking agent" and "coupling agent" refer to polyfunctional organic compounds which are reactive with both the starch hydroxyl groups and the foregoing described amines under aqueous alkaline conditions.

Such crosslinking agents include compounds having the structure A—B—A' wherein A is a functional group reactive with starch selected from the group consisting of epoxy, halogen, vinyl, allyl and acid halide, A' is a functional group reactive with both the starch and with the amine and which is halogen when the amine is tertiary or is selected from the group consisting of epoxy, halogen, vinyl, allyl, imine, isocyanate and acid halide when the amine is other than tertiary or quaternary. A and A' are not reactive with each other under the alkaline reaction conditions used herein. Group B is a divalent radical selected from the group consisting of —R— and —R'—O—R"—, wherein R is a $C_1$ to $C_9$ substituted or unsubstituted hydrocarbyl group and R' and R" are $C_1$ to $C_4$ hydrocarbyl groups.

Suitable crosslinking agents which have been found include 1,4-dichlorobutene-2, 1,3-dichloro-2-propanol (glycerol dichlorohydrin), 1,2-epoxy-4-chlorobutane, 1,2-epoxy-3-chloropropane (epichlorohydrin), epibromohydrin, β,β'-dichlorodiethyl ether, 1,4-pentadiene dioxide, 3,4-epoxy-1-butene, 4,5-epoxy-1-pentene, allyl bromide, allyl glycidyl ether, 3-chloropropene (allyl chloride), 4-chloro-1-butene, 2-chloropropionyl chloride, vinylacetyl chloride, allylacetyl chloride, 1,4-pentadiene, divinyl ether, 1,5-hexadiene and 1,6-heptadiene. Of these, 1,3-dichloro-2-propanol, 1,4-dichlorobutene-2 and epichlorohydrin are preferred.

It is preferred that sufficient crosslinking agent be used to produce a cationic intermediate starch product which, prior to depolymerization, has a Sedimentation Value of from about 81 to about 98.

Sedimentation Value (SV) is determined by cooking for one minute at 200°F a 2 percent by weight aqueous dispersion of the cationic intermediate product (product prior to being subjected to depolymerization), allowing 100 ml of the cooked dispersion to stand undisturbed at ambient temperature for a period of about 24 hours and determining the amount of sediment in ml. The amount of sediment is again determined after 96 hours to make sure that the amount measured has stabilized. The amount of sediment is related directly to the gelatinizability of the intermediate product and inversely to the degree of crosslinking. Thus, a low Sedimentation Value indicates a very highly crosslinked product, whereas a high Sedimentation Value indicates a lower degree of crosslinking.

The reaction of such crosslinking agents within the context of the invention is shown by the following depicted reactions in which epichlorohydrin and trimethylamine are used as the crosslinking agent and nitrogenous compound respectively:

(1) 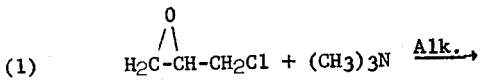

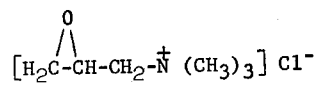

(2) 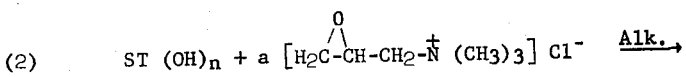

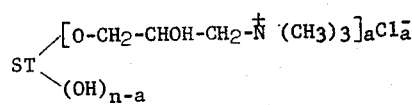

(3) 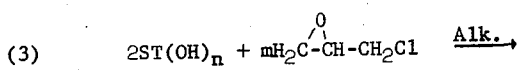

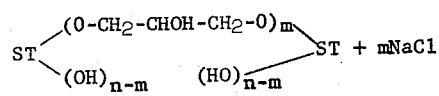

(4) 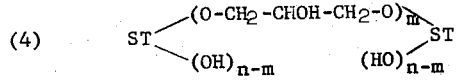

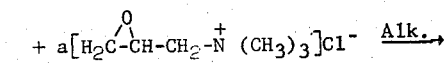

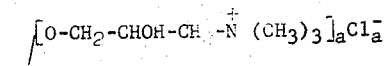

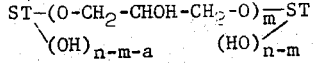

As used in the above-illustrated reaction mechanisms, the terms m and a do not infer the repetition of monomer units in a polymer chain, but the multiple random distribution of the indicated moieties along the starch molecule. The symbol ST denotes a starch molecule excluding its hydroxyl groups.

As will be shown in the examples herein below, the above-referred cationization and crosslinking of the starch can be carried out in a number of ways: (1) by first rendering the starch suspension alkaline and then admixing with the alkaline starch suspension a mixture of crosslinking agent and reaction product of the crosslinking agent with the amine; (2) by first rendering the starch suspension alkaline and then admixing therewith a mixture of crosslinking agent and amine; (3) by mixing the crosslinking agent and amine with the starch suspension in the absence of alkali and then rendering the admixture alkaline; or (4) by admixing with the starch suspension a mixture of crosslinking agent and reaction product of amine and crosslinking agent and then rendering the admixture alkaline.

While each of the sequences of carrying out the initial crosslinking and cationization of the starch are equivalent, nevertheless each may have an advantage in any particular situation. For example, if it is desired to obtain only a small degree of crosslinking (or subsequently, to depolymerize the crosslinked product to a lesser degree), it will generally be preferred to admix the reactants with the starch prior to rendering the reaction mixture alkaline. Also, in order to minimize losses by volatilization of certain amines, it may be preferred to complete reaction of the amine with the crosslinking agent prior to addition to the starch. It has been found that reaction efficiencies are in general higher if the alkaline catalyst is added to the starch suspension following the amine and crosslinking agent since this allows the amine and crosslinking agent to coreact without competition from the starch.

Suitable catalysts for the cationization steps of the process of the invention are strongly alkaline substances such as alkali metal hydroxides, alkaline earth metal hydroxides and quaternary ammonium bases, of which the alkali metal hydroxides, particularly sodium hydroxide, are preferred. The amount of alkaline catalyst should be within the range of from 0.01 to 0.1 mole of catalyst per mole of anhydroglucose unit (AGU), 0.01 to 0.08 mole/AGU being preferred.

Though the operable temperature of the cationization and crosslinking step may be as low as room temperature, it is nevertheless preferred to utilize an elevated temperature so long as it is below the gelatinization temperature of the starch. A reaction temperature of from 90°–135°F is preferred.

Especially when the process is conducted at elevated temperatures, it is preferred to conduct both the cationization/crosslinking and depolymerization steps in the presence of suitable concentrations of a gelatinization inhibitor in order to assure retention of the reaction product in the granular form. Saturated solutions of salts such as NaCl, $Na_2SO_4$ and $MgSO_4$ are useful for this purpose in which case alkaline catalyst concentrations as high as 0.2 mole per mole of anhydroglucose unit may be used without damage to the starch granule.

As is indicated hereinabove, a wide variety of amines may be used to render the starch cationic including ammonia and secondary and tertiary amines. The choice among these depends, inter alia, upon the degree of cationic charge which is desired as well as the reactivity of the amine with the crosslinking agent and the stability of that reaction product. Tertiary amines are preferred since both higher degrees of starch substitution as well as cationic charge are obtained thereby. Suitable amines are those containing 2 to 12 carbon atoms corresponding to the structure,

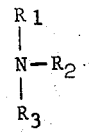

in which $R_1$ is a monovalent radical selected from the group consisting of hydrogen, alkyl, substituted alkyl, cycloalkyl, aryl, alkaryl, and aralkyl, $R_2$ and $R_3$ are monovalent radicals independently selected from the group consisting of alkyl, substituted alkyl, cycloalkyl, aryl, alkaryl, and aralkyl, and $R_2$ and $R_3$ when taken together form with the N atom saturated heterocyclic rings selected from the group consisting of substituted and unsubstituted piperidine, piperazine and morpholine, the length of any acyclic alkyl group being no greater than 4 carbon atoms.

Because of the crosslinking of the starch, which takes place in the initial step for making the product of the invention, the resultant product would not be readily gelatinizable and, depending upon the degree of crosslinking, might even be substantially incapable of gelatinization. Consequently, in order to retain adequate gelatinization capability, it is necessary to depolymerize the crosslinked starch. This thinning or degradation of the crosslinked starch may be accomplished by any of the methods well known in the art such as acid modification, oxidation, dextrinization and the like. Interestingly enough, it appears that the crosslinked starch depolymerizes in the same manner as untreated starch in that the basic starch chains are broken, not the crosslinking bonds. As a result of this unexpected phenomenon, the resultant depolymerized product exhibits not only good gelatinization characteristics, but also excellent viscosity stability, i.e. resistance to setback. Such resistance to viscosity increase on standing following depolymerization is quite surprising since ordinary, noncrosslinked, modified starches usually exhibit substantial tendency toward setback unless specifically treated to eliminate that tendency, e.g., by the addition of fatty acid soaps or by further derivatization.

The amount of depolymerization to be accomplished is determined by the product viscosity desired as well as by the extent of crosslinking. For a given level of desired viscosity, the amount of depolymerization is then related directly to the extent of crosslinking undergone by the starch in the first step of the process by which the starch is crosslinked and rendered cationic.

The invention will be more completely understood by reference to the following example:

EXAMPLE

This Example illustrates the preparation of a crosslinked cationic starch of the present invention. 185 g of epichlorohydrin was added to 367 g of trimethylamine hydrochloride over a two hour period while maintaining the temperature of the reaction mixture at 70°–75°F. When the addition was complete, the temperature of the mixture was allowed to exotherm to 85°-95°F and held there for about one hour prior to being cooled to ambient temperature.

102 g of the reaction product was added to 6 liters of an aqueous starch slurry containing 2,541 g of untreated corn starch. 65 g of hydrated lime was added to the slurry and the temperature of the slurry raised to 113°-117°F and maintained there for 12 hours. The resultant crosslinked cationic starch had an SV of about 98 and after standing for 96 hours the product had an SV of about 90. 160 ml of 20°Be muriatic acid was added to the slurry, the slurry heated to 129°F and maintained at this temperature for 15½ hours. The pH of the slurry was adjusted to 4.8 by the addition of a solution of sodium carbonate. The product was recovered on a vacuum filter and washed to a low salt level. The resulting product had a nitrogen content of 0.15 percent by weight and an alkaline paste fluidity of 278.

The terms and expressions which have been employed are used as terms of description and not of limitation, and it is not intended to exclude any equivalents of the features shown or described or portions thereof, since it is recognized that various modifications are possible within the scope of the invention claimed.

What is claimed is:

1. A gelatinizable crosslinked cationic starch product prepared by the sequential steps of:
    a. reacting an aqueous suspension of granular starch under non-gelatinizing conditions with (1) an alkali-catalyzable polyfunctional organic crosslinking agent, the functional moieties of which are reactive with starch hydroxyl groups, ammonia, and secondary and tertiary amine groups under aqueous alkaline conditions and (2) the reaction product of said crosslinking agent with a nitrogenous compound selected from the group consisting of ammonia and $C_{2-12}$ secondary and tertiary amines having the structure,

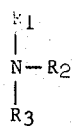

in which $R_1$ is a monovalent radical selected from the group consisting of hydrogen, alkyl, substituted alkyl, cycloalkyl, aryl, alkaryl, and aralkyl, $R_2$ and $R_3$ are monovalent radicals independently selected from the group consisting of alkyl, substituted alkyl, cycloalkyl, aryl, alkaryl, and aralkyl, and $R_2$ and $R_3$ when taken together form with the N atom saturated heterocyclic rings selected from the group consisting of substituted and unsubstituted piperidine, piperazine and morpholine, the length of any acyclic alkyl group being no greater than 4 carbon atoms, the reaction mixture having a slurry alkalinity of from about 20 to about 65, the amount of crosslinking agent being sufficient to impart to the starch a Sedimentation Value of from about 81 to about 98, and the amount of amine being sufficient to impart to the starch a degree of cationic substitution of from about 0.001 to about 0.10; and
    b. depolymerizing the cationic crosslinked reaction product of step a to an alkaline paste fluidity of from about 201 to 299.

2. The cationic starch product of claim 1, in which the reaction mixture is prepared by first rendering the starch suspension alkaline and then admixing therewith a mixture of the crosslinking agent and reaction product of the crosslinking agent with the amine.

3. The cationic starch product of claim 1, in which the reaction product is prepared by first rendering the starch suspension alkaline and then admixing therewith the crosslinking agent and amine.

4. The cationic starch product of claim 1, in which the reaction mixture is prepared by first admixing crosslinking agent and amine with the starch suspension in the absence of alkali and then rendering the admixture alkaline.

5. The cationic starch product of claim 1, in which the reaction mixture is prepared by first admixing with the starch suspension a mixture of the crosslinking agent and reaction product of the crosslinking agent with the amine in the absence of alkali and then rendering the admixture alkaline.

6. The cationic starch product of claim 1, in which the crosslinking agent conforms to the configuration A—B—A' wherein A and A' are functional moieties reactive with both the nitrogenous compound and the hydroxyl groups of the granular starch under alkaline conditions and B is a divalent radical selected from the group consisting of —R— and —R'—o—R''—, wherein R is a $C_{1-9}$ hydrocarbyl group and R' and R'' are $C_{1-4}$ hydrocarbyl groups.

7. The cationic starch product of claim 6 in which the functional moieties are selected from the group consisting of halogen and, when the aforesaid nitrogenous compound is other than a tertiary or quaternary amine, allyl, halogen, vinyl, acid halide, epoxy, imine and isocyanate.

8. The cationic starch product of claim 7, in which the crosslinking agent is epichlorohydrin.

9. The cationic starch product of claim 7, in which the crosslinking agent is 1,4-dichlorobutene-2.

10. The cationic starch product of claim 7, in which the crosslinking agent is 1,3-dichloro-2-propanol.

11. The cationic starch product of claim 6, in which the nitrogenous compound is trimethylamine.

12. The cationic starch product of claim 6, in which the nitrogenous compound is diethylamine.

13. A method for the manufacture of a gelatinizable crosslinked cationic starch product comprising the sequential steps of:
    a. reacting an aqueous suspension of granular starch under nongelatinizing conditions with (1) an alkali-catalyzable polyfunctional organic crosslinking agent the functional moieties of which are reactive with starch hydroxyl groups, ammonia, and secondary and tertiary amine groups under aqueous alkaline conditions and (2) the reaction product of said crosslinking agent with a nitrogenous compound selected from the group consisting of ammonia and $C_{2-12}$ secondary and tertiary amines having the structure,

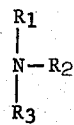

in which $R_1$ is a monovalent radical selected from the group consisting of hydrogen, alkyl, substituted alkyl, cycloalkyl, aryl, alkaryl, and aralkyl, $R_2$ and $R_3$ are monovalent radicals independently selected from the group consisting of alkyl, substituted alkyl, cycloalkyl, aryl, alkaryl, and aralkyl, and $R_2$ and $R_3$ when taken together form with the N atom saturated heterocyclic rings selected from the group consisting of substituted and unsubstituted piperidine, piperazine and morpholine, the length of any acyclic alkyl group being no greater than 4 carbon atoms, the reaction mixture having a slurry alkalinity of from about 20 to about 65, the amount of crosslinking agent being sufficient to impart to the starch a Sedimentation Value of from about 81 to about 98, and the amount of amine being sufficient to impart to the starch a degree of cationic substitution of from about 0.001 to about 0.10; and b. depolymerizing the cationic crosslinked reaction product of step a to an alkaline paste fluidity of from about 201 to 299.

* * * * *

UNITED STATES PATENT AND TRADEMARK OFFICE
CERTIFICATE OF CORRECTION

PATENT NO. : 3,884,909
DATED : May 20, 1975
INVENTOR(S) : Adrian P. Kightlinger, Edward K. Crosby (deceased), Edwin L. Speakman It is certified that error appears in the above-identified patent and that said Letters Patent are hereby corrected as shown below:

Title page, left hand column; under Related U.S. Application Data:

[63] should read as follows:
[63] Continuation - in - part of Ser. No. 400,300, September 24, 1973, abandoned, which is a continuation - in - part of Ser. No. 298,067, October 16, 1972, Pat. No. 3,778,431.

Column 7, line 66; "a" should read --(a)--.

Column 8, line 26; "R'-o-R" should read --R'-O-R"--.

Column 10, line 7; "a" should read --(a)--.

Signed and Sealed this twenty-eight Day of October 1975

[SEAL]

Attest:

RUTH C. MASON
Attesting Officer

C. MARSHALL DANN
Commissioner of Patents and Trademarks